United States Patent [19]

Justus et al.

[11] Patent Number: 4,935,685
[45] Date of Patent: Jun. 19, 1990

[54] MOTOR CONTROLLER FOR PUMPING UNITS

[75] Inventors: Marvin W. Justus, Midland; David L. Watts, Odessa; Ernest D. Showalter, Midland, all of Tex.

[73] Assignee: Sargent Oil Well Equipment Company, Tulsa, Okla.

[21] Appl. No.: 84,563

[22] Filed: Aug. 12, 1987

[51] Int. Cl.$^5$ .......................... H02P 1/26; H02H 7/08
[52] U.S. Cl. .................... 318/798; 318/806; 318/778; 417/18; 361/24; 361/33
[58] Field of Search .................. 417/1, 12, 18, 42, 45, 417/33; 361/24, 25, 33, 23, 30, 31, 90, 91, 92; 318/474, 798, 806, 778

[56] References Cited

U.S. PATENT DOCUMENTS

| | | |
|---|---|---|
| 3,191,114 | 6/1965 | Reed . |
| 3,440,512 | 4/1969 | Hubby ................................ 318/474 |
| 3,509,824 | 5/1970 | Schmidly, Jr. ...................... 318/474 |
| 3,778,694 | 12/1973 | Hubby et al. . |
| 4,007,401 | 2/1977 | Kimmel ............................. 361/31 |
| 4,044,288 | 8/1977 | Godfrey ............................. 361/25 |
| 4,319,298 | 3/1982 | Davis et al. ........................ 361/24 |
| 4,354,214 | 10/1962 | Walton .............................. 361/23 |
| 4,453,117 | 6/1984 | Elms et al. ......................... 361/33 |
| 4,490,094 | 12/1984 | Gibbs . |
| 4,695,779 | 9/1987 | Yates . |

Primary Examiner—David Smith, Jr.
Attorney, Agent, or Firm—William D. Jackson

[57] ABSTRACT

A method and apparatus for controlling the operation of an oil well pumping unit in which the prime mover is a polyphase AC electric motor. The system comprises means for generating a plurality of signals representative of motor fault parameters including a motor winding overtemperature fault, undervoltage fault, and a phase imbalance fault. Upon occurence of a fault, a contactor in the motor supply leads is open to shut down the motor. After such shutdown because of undervoltage or phase imbalance faults the fault parameters are continuously scanned and once the fault has been cleared the motor is restarted. Where motor shutdown occurs because of an over temperature fault, the motor is maintained in a latched off shut down condition until an operator implemented reset occurs. An accessible counting memory is provided having separate registers for each of the fault conditions.

14 Claims, 3 Drawing Sheets

MOTOR CONTROLLER FOR PUMPING UNITS

TECHNICAL FIELD

This invention relates to the control of electric motors and more particularly to the control of polyphase electric motors of the type used as prime movers on oil well pumping units.

ART BACKGROUND

Motor control systems are used in the oil industry for the protection of electric motors employed as prime movers in sucker-rod type pumping units Such electric motors typically take the form of three phase AC motors although other polyphase motors, e.g., two phase or four phase, may also be employed. Sucker-rod pumping units are widely used in the oil industry in order to recover fluids from wells extending into subterranean formations. Such units include a sucker-rod string which extends into the well to drive a downhole pump and means at the surface of the well for reciprocating the rod string. Typical of such units are the so-call "beam type" pumping units in which the sucker-rod string is suspended from a walking beam which is pivotally mounted on a Sampson post and driven by an electric motor.

The load on the electric motor varies widely during each pumping cycle and it is a conventional practice to monitor the operation of the unit and to shutdown the motor upon the occurrence of an unacceptable fault condition. For example, U.S. Pat. No. 3,778,694 to Hubby et al discloses a system for detecting a "pump-off" condition by monitoring the load on the motor during the downstroke of the pumping unit. When the system detects a motor load which is abnormally low in comparison with a predetermined standard, it acts to remove power from the motor. In the Hubby system, the power supply is three phase AC power and a timing unit is connected across one phase of the power supply. After a pump-off condition is determined and the motor shutdown, a switch in contactor relay circuit is periodically closed by the timing system in order to restart the pump.

Pump-off control can also be effected by the simple expedient of sensing the motor speed and generating a signal representative thereof. When the motor speed signal exceeds a set point value indicative of an approaching pump-off condition, the motor is automatically shutdown. A more complex system for controlling the operation of a well pumping unit based upon pump-off conditions and other fault indications is disclosed in U.S. Pat. No. 4,490,094 to Gibbs. In Gibbs, instantaneous speeds of revolution for the motor are determined and applied to arrive at a value of at least one selected parameter which is used to implement a control action. The selected parameter may be power output, modified average current, power input, thermal current and power factor for the prime mover along with transmission unit torque, instantaneous polish rod loading, or total polish-rod work.

Yet another protection system, which is especially useful in the control of well pumping unit prime movers to avoid stall conditions, is disclosed in U.S. Pat. No. 4,695,779 to Yates. In this system, a suite of stall condition set points are established corresponding to the torque mode of the motor. The torque mode of the motor is sensed to select the appropriate set point and a motor speed signal is compared with the set point to sense an approaching stall condition and shutdown the motor.

After a pumping unit prime mover is shutdown, it is a conventional practice to use a time delay restart system to again start the motor. A time delay may be provided for any one of several reasons One reason is to provide a sufficient time period to accommodate correction of a pump-off condition as described in the aforementioned patent to Hubby. Yet another reason is disclosed in U.S. Pat. No. 3,191,114 to Reed wherein time delay motor starting systems are employed to place a plurality of pumping units on line sequentially in order to avoid the cumulative effect of simultaneous starting currents. Time delays are also conventionally employed when a pumping unit electric motor is shutdown because a low voltage condition occurs or where a phase imbalance condition results from a disparity between the phase voltages provided to a the polyphase motor. For example, phase imbalance may be determined by monitoring the voltage supply to the motor to maintain a cumulative running average of the three voltages across the three phases. In the event of an imbalance between the highest and lowest voltage exceeding a predetermined set point, the motor is shut down. Appropriate timers are activated upon shutdown and the motor is again restarted after an appropriate time delay and continues running so long as the low voltage or imbalance condition does not then exist.

Whereas shutdown faults such as phase imbalance, low voltage or pump-off conditions are employed to implement time delay restart actions, other faults such as excessive motor temperature serve to lock the prime mover motor in the off or shutdown condition where it cannot be restarted without operator intervention such as by a manual reset. For example, it is common to provide the motor with a thermostatic control based upon one or more motor winding thermostats. When a thermostat opens due to excessive motor heat, a relay latches the motor control in the "off" position, requiring a manual reset before the motor can be restarted.

DESCRIPTION OF THE INVENTION

In accordance with the present invention there is provided a new and improved process for the controlling the operation of a well produced by the operation of a sucker rod type pumping unit. An integrated control system is provided in which certain fault conditions are employed to shutdown the pumping unit motor with continued scanning of the fault conditions whereas other fault conditions may be employed to shutdown the pumping unit in a manner such that the motor control is latched out and the motor can only be restarted manually or after a time delay. The invention is implemented in the control of a well produced by a sucker-rod type pumping unit. The pumping unit means includes means for reciprocating the sucker-rod string to produce fluid from a subterranean location in the well. The pumping unit is driven by a polyphase electric motor under conditions in which the motor speed normally varies between maximum and minimum values during strokes of the rod stroke. The motor is energized by a polyphase AC electric power supply. In carrying out the invention, a plurality of signals representative respectively of a plurality of sensed parameters for the motor are generated. The sensed parameters include at least one internal winding temperature of the motor and the voltages across the respective phase legs of the motor supply. The voltages, for three phases in the case for a three phase motor, are compared for a preset amount of time with a set point and upon the detection of an undervoltage fault condition a control function is generated to shutdown the motor. The phase voltage signals are also compared in order to sense deviations between the phase voltages. When a sensed deviation exceeds a set point indicative of a phase imbalance for a preset amount of time a control function is generated to shutdown the motor. After motor shutdown because of either low voltage or phase imbalance, scanning of the voltage signals continues. When the phase voltage signals exceed the undervoltage set point and deviation between the signals is acceptable, i.e., less than the phase imbalance set point, the motor is restarted. Preferably, the motor when shutdown because of an overtemperature fault, is maintained in a latched off shutdown state.

In a further aspect of the invention, a motor speed signal representative of the speed of the motor is compared with high speed and low speed set points. The high speed set point is representative of an approaching pump-off condition and the low speed set point representative of an approaching stall condition. If the motor speed signal reaches either set point, a control function is generated to shutdown the motor. When the motor is shutdown because of a stall condition fault, a latched off state is maintained.

BEST MODES FOR CARRYING OUT THE INVENTION

The invention will be described initially with reference to its use in regulating the operation of a variable speed high slip three phase induction motor used as a prime mover in a beam pumping unit. The invention is especially well suited to this application. However, as will become apparent from the following description, the invention may be used in the control of other polyphase AC motors.

Figure 1:
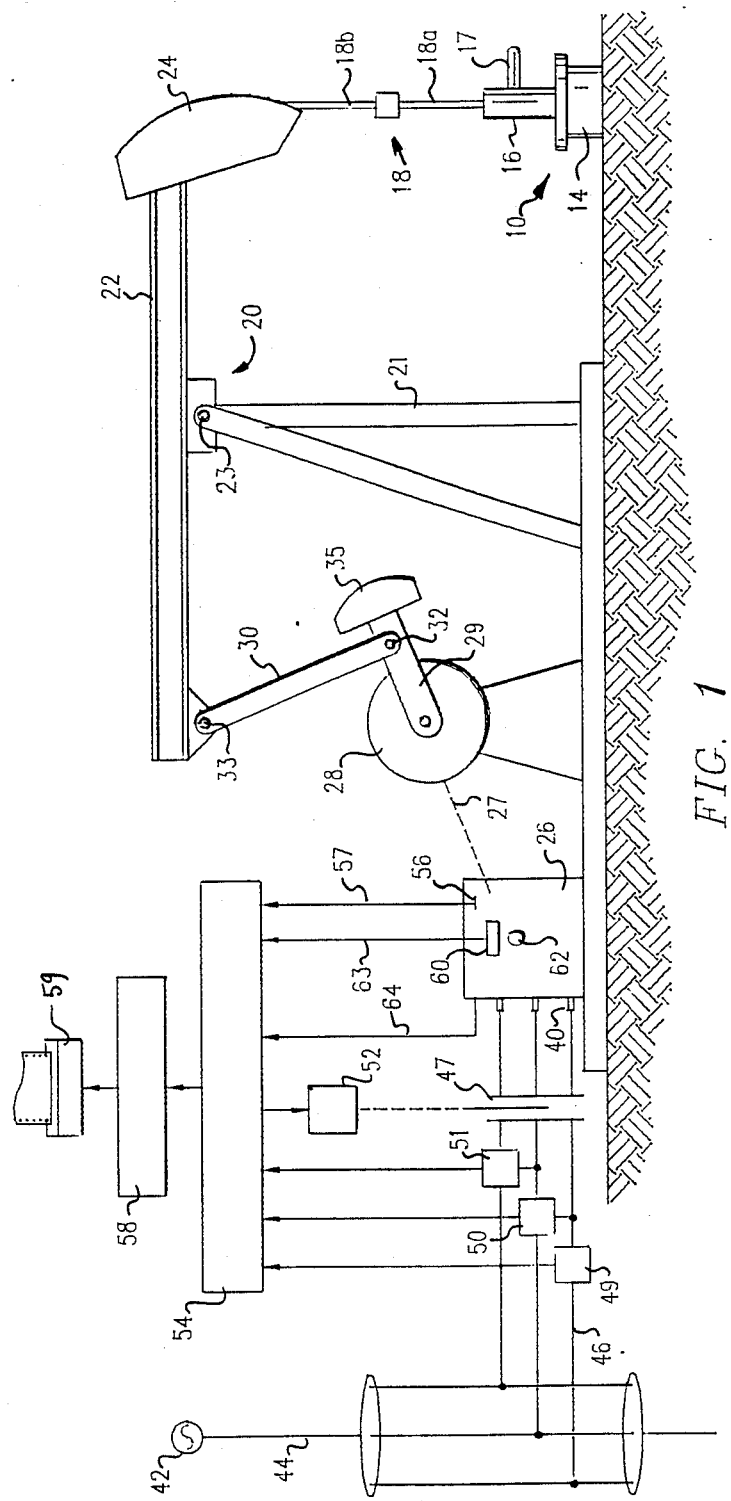
FIG. 1 is a schematic block diagram illustrating the use of the invention to provide a stall protection for an electric motor used as a prime mover of a sucker-rod type pumping unit.

Turning first to FIG. 1, there is illustrated the wellhead 10 of a well which extends from the earth's surface into a subterranean oil producing formation (not shown). The wellhead comprises the upper portions of a casing string 14 and a tubing string 16 which extends to a suitable depth within the well, e.g., adjacent the subterranean formation. Liquid from the well is produced through the tubing string 16 by means of a downhole pump (hot shown) to the surface where it passes into a gathering line 17.

The downhole pump is actuated by reciprocal movement of a sucker-rod string 18. Rod string 18 is suspended in the well from a surface support unit 20 having a walking beam 22 which is pivotally mounted on a Sampson post 21 by a pin connection 23. The sucker-rod string includes a polished rod section 18a which extends through a stuffing box (not shown) at the top of the tubing string and a section 18b formed of a flexible cable. The cable section 18b is connected to the walking beam 22 by means of a "horsehead" 24.

A polyphase AC electric motor 26 drives the walking beam through a drive system 27, e.g., a belt drive, a crank 28, a crank arm 29, and a pitman 30 which is pivotally connected between the crank arm and walking beam by means of pin connections 32 and 33. The outer end of crank arm 29 is provided with a counterweight 35 which balances a portion of the load on the sucker-rod string in order to decrease the load variations on the electric motor.

Figures 2A, 2B:
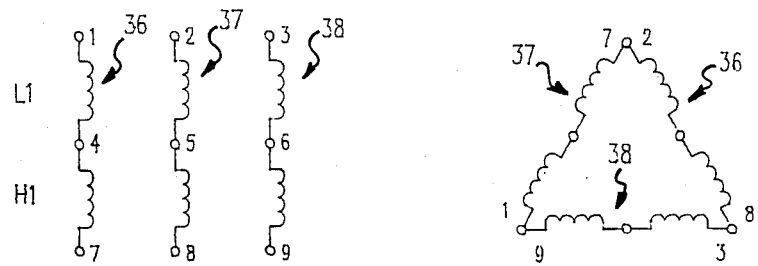
FIG. 2A is a schematic illustration of the motor winding for a nine lead motor.
FIG. 2B is a schematic illustration of the motor windings of FIG. 2A connected in a delta configuration.

The polyphase motor 26 may be of any suitable type, but usually will take the form of a high slip three phase induction motor having six, nine or twelve leads which can be connected in different configurations to give a plurality of operating modes as described below. It will be recognized, however, that the invention can also be employed with a single mode motor having only three leads. A typical motor used in oil field operations and to which the invention is applicable is a nine lead, four mode motor such as the Sargent Econo-Pac motor available from Sargent Oil Well Equipment Co. FIG. 2A illustrates schematically the motor windings and terminal leads for such a nine lead motor. Thus, motor windings 36, 37 and 38 are illustrated as compound impedance windings, each having a low impedance leg designated by LI and a high impedance leg desigated by HI. The leads for windings 36, 37 and 38 are designated as leads 1 through 9 as illustrated in FIG. 2A. To connect the motor windings in a high torque mode, the motor windings are connected in a delta connection with power applied to leads 1, 2 and 3. In this case, the connections will be between leads 1 and 9, 3 and 8, and 2 and 7 to arrive at the delta connection illustrated in FIG. 2B. For the low torque mode, terminal leads 7, 8 and 9 are connected with power applied to leads 1, 2 and 3 to arrive at a Y configuration. Intermediate torque modes for the motor may be arrived at by applying power to leads 7, and 9 and connecting leads 2 and 4, 3 and 5, and 1 and 6 for a modified Y configuration or by connecting leads 4 and 8, 5 and 9, and 6 and 7 with power to leads 1, 2, and 3 for a modified delta configuration. Referring to FIG. 1, these connections may be made at a terminal board indicated schematically by reference numeral 40.

In the normal course of operation of the pumping unit shown in FIG. 1, the speed of the electric motor will undergo excursions between maximum values which normally occur near the end of the upstroke and the downstroke and minimum values which occur at intermediate locations during the upstroke and downstroke. By way of example, the motor speed may vary from a value of about 1200 rpm at the top of the upstroke and the beginning of the downstroke. As the pump begins the downstroke, the load on the motor 26 will increase and the motor will pass through a minimum value of perhaps 700 rpm and then begin to increase until it reaches a maximum value at the end of the downstroke and the beginning of the upstroke.

As shown in FIG. 1, power is supplied to the electric motor 26 from a suitable three phase AC source 42 via a three-phase main 44 which typically will supply numerous other electric motors in the same field. The power supply circuit 46 for the motor 26 is provided with a contactor 47 through which the motor is energized and voltage transducers 49, 50 and 51 for measuring the AC voltage in each phase leg of the power supply. Contactor 47 is under the control of a relay 52 which in turn responds to control functions from a motor control unit 54.

Signals from the transducers 49, 50 and 51 are applied via suitable transmission means such as a multiplexer to the central controller 54. In addition, an internal temperature sensing unit 56 monitors the motor winding temperature and applies a signal representative of temperature via channel 57 to the controller. Temperature sensing unit 56 may be of any suitable type such as a thermistor having a DC output. Although only one temperature sensor is shown, typically the motor may include a plurality of temperature sensors, e.g. 6 in number, mounted in the stator winding.

The motor 26 is also equipped with a transducer 60 which functions to generate a motor speed signal. Transducer 60 may be of any suitable type, but preferably will take the form of a Hall effect transducer or similar type transducer which generates a pulsed signal which is frequency proportional to the motor speed. Thus, the period of the signal between pulses varies inversely with motor speed. Where transducer 60 is a Hall effect transducer, the motor shaft 62 may be provided with a magnet (not shown) so that a pulse is generated for each revolution of the motor. Alternatively, the transducer system may be configured to generate more than one pulse for each motor revolution.

The motor speed signal is applied to the controller unit 54 via channel 63. The terminal board 40 of the motor is also scanned to determine the torque mode in which the motor is operating and this information is applied to the controller unit via channel 64. The torque mode configuration of the motor is determined by sensing voltage parameters at the selected motor winding leads to determine the presence of a voltage differential or where the motor windings are connected together, a no voltage condition. As explained in greater detail in the aforementioned application Ser. No. 864,717 to Yates relative voltage values may be sensed at the motor winding terminals in order to arrive at the torque mode determination. For example, for the system depicted by FIG. 2, the torque mode for the motor can be determined by sensing the voltages at winding leads 2, 3, 4, 8 and 9 to detect a comparative voltage, no voltage situation by comparing the voltage at lead 3 with lead 8, lead 2 with lead 4, lead 4 with lead 8, and lead 9 with lead 8. As further explained in U.S. Pat. No. 4,695,779 to Yates, the controller unit can contain or respond to a plurality of set point generators each of which generates a stall condition suite corresponding to one or more torque modes of the motor. For a further description of torque mode determination to arrive at appropriate stall speed set points for the motor, reference is made to the aforementioned application Ser. No. 864717, the entire disclosure of which is incorporated herein by reference.

In FIG. 1, the motor winding leads for the different torque mode connections, the contactor, and the supply circuit containing the voltage transducers are shown to be spaced apart for the purpose of clarity. However, as a practical matter, it is to be recognized that these various components can be, and normally will be, all mounted in a common terminal board associated with the motor.

An approaching pump-off condition for the unit is indicated by a decreased load condition which results in an increased motor speed over a cycle of operation of the pumping unit. A high motor speed set point is selected and when the average motor speed over a pump cycle exceeds this point, the controller again functions to generate a control function, activating relay 52 to open contactor 47 in the motor supply circuit.

Depending upon the fault parameter which leads to shutdown of the motor, the motor is either placed in a latched-off state in which it can be only restarted manually or by another operation externally of the controller logic or the controller proceeds under the control of a suitable scanning mechanism such as an elapsed time timer to continuously sense the fault parameters and when a no fault condition is detected, automatically restart the motor. Motor operation is continued until another fault condition is detected. In the embodiment illustrated, where the motor is shutdown because of an undervoltage, or phase imbalance fault, the motor is shutdown in a nonlatched state. In this mode, the controller scans the fault indicating parameters, the phase voltages and comparative phase voltages, and upon detecting a condition in which the undervoltage and phase imbalance fault is corrected generates a signal to close contactor 47 and restart the motor. The pump-off fault also results in a nonlatched shutdown of the motor. In this case, the motor may be restarted after the exploration of a time delay which can be set by the operator for the particular well involved. Where the motor is shutdown because of a stall condition or an overtemperature fault, a latched out state results. In this case the motor can be restarted only by a suitable operator implemented override such as a manual reset.

The controller 54 is also provided with an output channel to access an accounting memory unit 58. Each time a fault is detected and a control function generated, regardless of whether the motor is shutdown in a latched or non-latched mode, an accounting signal is applied to memory unit 58. Memory unit 58 provides a register for each designated fault condition and also for the total number of all faults. The memory can be accessed by the operator at any time to provide a readout on a printer 59, or other suitable readout device, showing the number of pumping unit shutdowns under each fault condition and the total number of faults shutdowns for a designated time interval. For example, the accounting memory unit 58 can be assessed monthly to show the total shutdowns and the fault shutdowns under each category for the previous month of operation.

Figure 3:
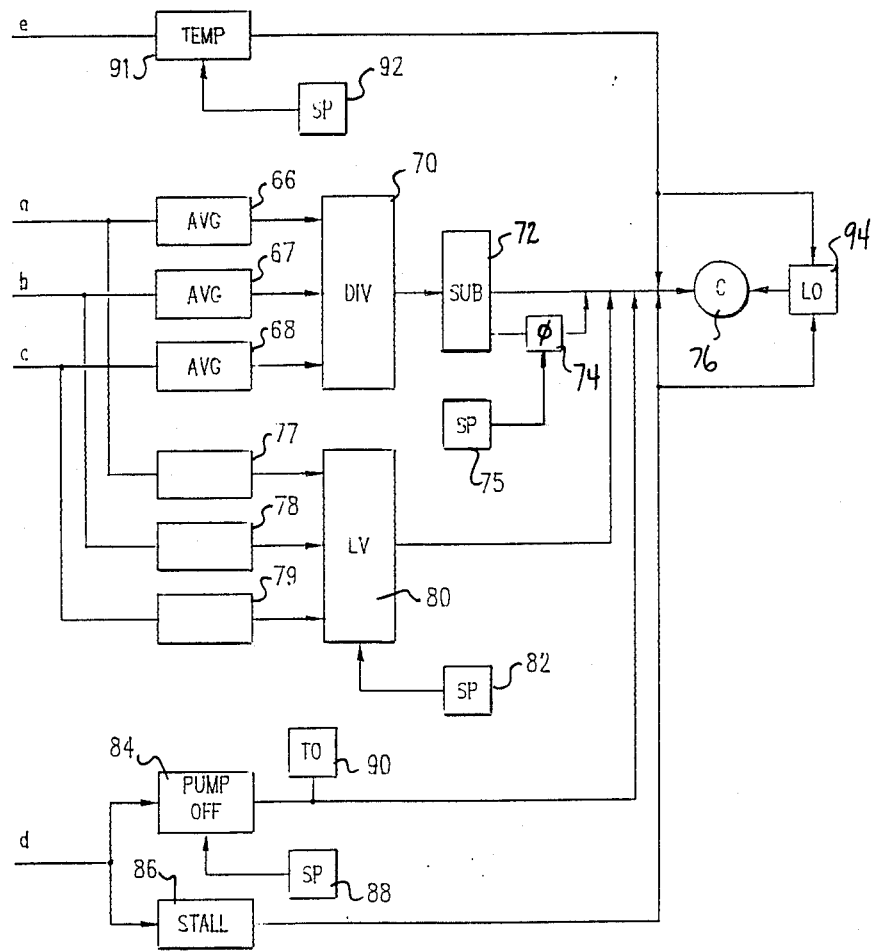
FIG. 3 is a schematic illustration of one embodiment of the invention employing hard wired logic circuitry.

Turning now to FIG. 3, there is illustrated one form of hard wired logic circuitry which may be employed to carry out the invention. In FIG. 3, the signal inputs from voltage transducers 49, 50 and 51 are indicated by references a, b and c, respectively. The voltage signals a, b and c are applied to suitable averaging unit 66, 67 and 68, respectively, which produce outputs representative of the running averages of the applied voltages over a suitable time frame of motor operation. For example, the outputs of units 66, 67 and 68 may be the averages of the transducer voltages for the previous one minute of operation. These units may be of any suitable type. For example, where the transducer signals are DC voltages, units 66, 67 and 68 may each take the form of an RC averaging circuit of a suitable time constant to show the average voltage for the previous one minute of operation.

Phase imbalance may be indicated by any appropriate deviation between the phase voltage signals. A conventional practice for determining phase imbalance is in accordance with the following relationship:

$$UB = 100\left(1 - \frac{LV}{HV}\right) \qquad (i)$$

wherein:
UB is the phase imbalance expressed as a percentage,
HV is the highest cumulative average voltage over the time period involved, and
LV is the lowest average cumulative voltage for the time period involved.

Where the percent imbalance exceeds a designated quantity, e.g. 5%, and unacceptable phase loss condition is indicated and the motor is shutdown.

From an examination of equation 1, it can be recognized that a phase imbalance state can be determined by simple divide and subtract logic.

Thus, the outputs from averaging circuits 66, 67 and 68 are applied to a ratio taking comparator 70 in which the average phase voltage values are divided by one another and compared to arrive at the numerically lowest ratio. The output from comparator 70 which is representative of the ratio obtained by dividing the lowest of the signals from the average unit bank by the highest of the signals from the averaging bank is applied to a subtract circuit 72 where it is subtracted from a reference value corresponding to a logical "one" to produce an output representative of the percent imbalance. The output from subtract unit 72 is applied to comparator 74 where it is compared with a reference from a set point generator 75 corresponding to a desired value, e.g. 5%, and if the set point is exceeded, an output is applied to a command 76 terminal which functions generate a control function to activate contactor relay 52 and an accounting function to access the appropriate register in the accounting memory.

The transducer voltage signals a, b, and c are also applied to an undervoltage comparator where they are compared with an undervoltage reference, for example, of 10% less than the nominal voltage value. If the voltage of any one of the three phase legs falls below the reference point, an appropriate undervoltage control function appears at the output of the undervoltage comparator to again shutdown the motor. Preferably, running cumulative averages of the outputs from voltage transducers 49, 50 and 51 may be employed for comparison with the undervoltage reference from setpoint generator 82 similarly as in arriving at the phase imbalance determination. More specifically, voltage signals a, b, and c are applied to averaging circuits 77, 78 and 79. The outputs from these averaging circuits are applied to an undervoltage comparator 80 where they are compared with the output from an undervoltage set point generator 82. Where any one of the phase voltages falls below the reference provided by the set point generator, an appropriate signal appears at the output of comparator 80 and is applied to terminal 76. In employing average voltage values for the undervoltage determination, the time constants over which the voltages are averaged preferably are greater than the time constants used in arriving at the cumulative average voltage values for the phase imbalance determination. For example, where running averages for phase imbalance determination are taken over the last 10 seconds of operation (units 66, 67, & 68), cumulative averages for undervoltage fault determination may be determined over the previous 15 seconds of motor operation.

From the foregoing description, it will be recognized that the phase imbalance fault determination is based upon relative voltage values whereas the undervoltage fault determination is based upon absolute voltage values. Considering a nominal 480 volts AC three-phase supply, if the highest voltage of a phase leg is 480 volts AC, a 5% phase imbalance fault will be indicated at the lowest voltage falls below 456 AC for preset amount of time. However, a voltage of 447 volts AC for one phase will be acceptable if the highest voltage for a phase does not exceed 470 volts AC. The undervoltage set point, however, will be such as to indicate a fault at a low voltage condition, perhaps 432 volts AC in a phase leg, regardless of what the voltages across the other two phases may be.

The motor speed signal d from transducer 64 is applied to pump-off and stall condition units 84 and 86, respectively. Operation of the stall condition unit 86 is such as to produce a control function at its output when the motor speed falls below a designated stall set point as described in greater detail in the aforementioned application Ser. No. 864,717. In pump-off unit 84, the motor speed signal is compared against a reference from set point generator 88 indicative of an unacceptably high motor speed and when this set point is exceeded a control function appears at the output of unit 84. In simplest form, the pump-off unit 84 may take the for of a cumulative counter and the set point generator 88 a timer which functions to clear and reset the counter after a designated time interval corresponding to one cycle of pump operation. If the motor speed is sufficient such that pulse output from transducer 64 reaches a designated level in the counter before being reset by the timer a motor control function appears at the output of unit 84. The output from pump-off unit 84 is also applied to a timeout restarting unit 90 which functions to restart the motor after a time determined by the operator to be sufficient to allow the well to fill to avoid the pump-off condition.

The temperature signal e from transducer 56 may be a DC voltage or current signal which is proportional to the sensed temperature in the motor windings and is applied to comparator 91. When the temperature exceeds a reference applied by set point generator 922. The output of unit 91 acts to initialize a motor control function to shut in the motor.

The outputs from stall protector unit 84 and temperature unit 91 are applied to a latchout unit 94 which functions to maintain the contact controller 52 in the open conditions regardless of any occurrences respecting the other fault conditions. That is, the motor will remain inoperative until an override such as a manual push button is operated to restart the motor. Where motor shutdown is due to pump-off, the motor will restart after a delay time interval as described above and where motor shutdown is due to a voltage or phase imbalance the motor will restart automatically upon the occurrence of a no fault condition, in the circuitry depicted in FIG. 3 as indicated by the absence of a control function output for units 74 and 80.

Figure 4:
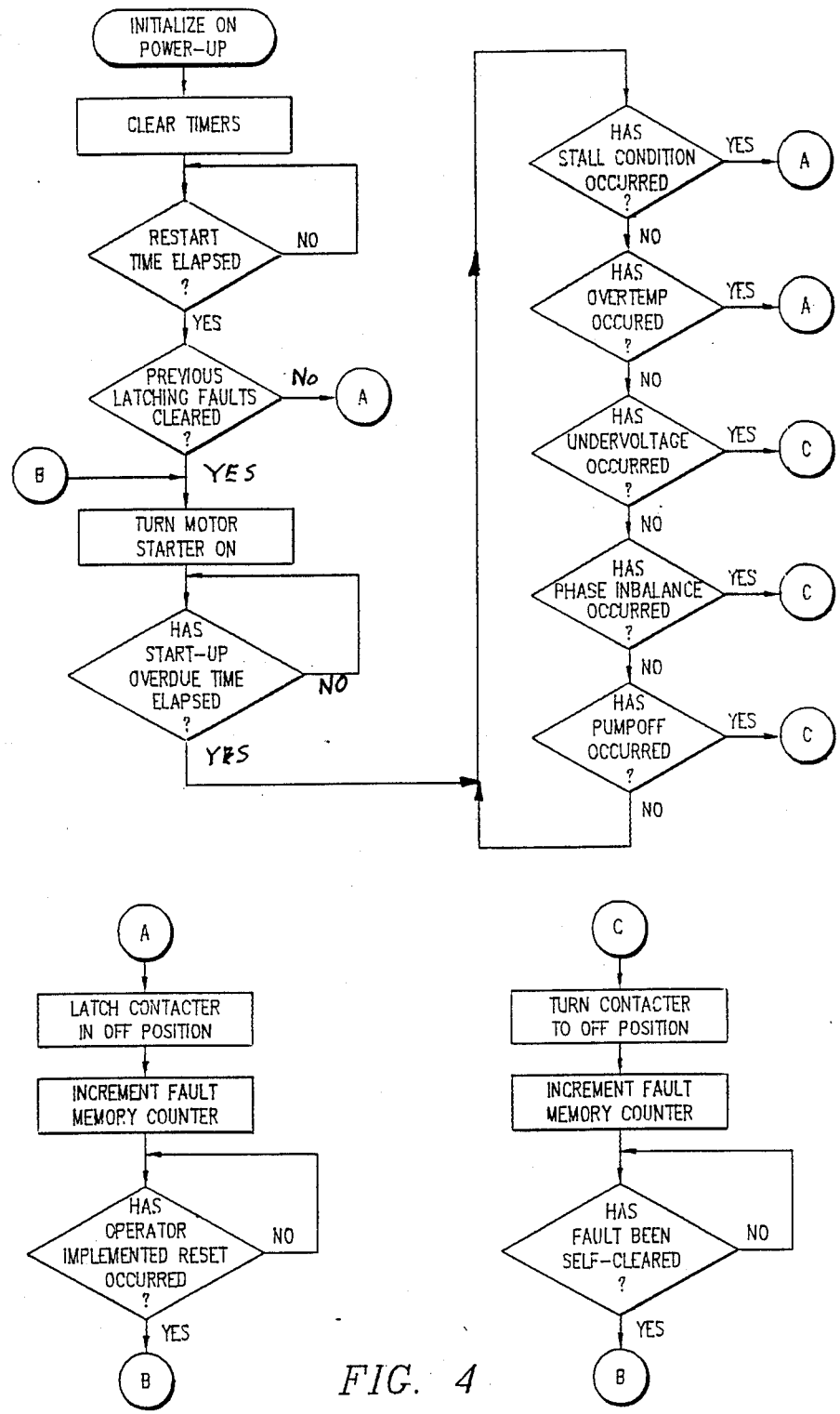
FIG. 4 is a flow chart of a program routine for implementation of the invention by a special purpose digital computer.

FIG. 4 is a flow chart illustrating a computer routine which may be employed in implementing the present invention by means of a digital computer. Such computer utilization may be accomplished by means of a dedicated microprocessor or a central processor used for the control of a plurality of pumping units. In the routine illustrated in FIG. 4, it is assumed that the controller 54 (FIG. 1) is a dedicated microprocessor.

As shown in FIG. 4, when power is restored to the pumping unit, the program acts to clear all the program timers (reset to 0) and then checks to see if the restart time for the particular well involved has elapsed. This accommodates a large number of pumping units in the field each of which may be have a different restart time delay to avoid a large number of units coming on line at the same time. Assuming the restart time has elapsed, the program checks to see whether previous latching faults (stall condition and overtemperature) have been cleared.

Upon determining that previous latching faults have been cleared, the pump motor is turned on and after the startup override time is elapsed, normally a few seconds, the system proceeds to check the various fault parameters. The startup override timer provides for a a period of time, normally a few seconds, to allow the pumping unit to start and reach a steady state condition where startup transients are no longer present which might inadvertently indicate a fault condition.

Assuming the startup time has elapsed, the program proceeds to check each of the fault parameters involved. If no faults are detected, the program loops to recheck the fault parameters. Upon the detection of a fault parameter the motor contactor is opened in either the latched condition (AS) or the unlatched condition (C). If the unit shuts down because of undervoltage, phase imbalance, or pumpoff, the program checks continuously to see if the fault has been cleared. Upon detection of a fault cleared condition the motor is turned on and after the startup time has elapsed, the program proceeds to operate as before. If a latched off fault condition is detected the motor will not be started until an operator implemented reset occurs.

Having described specific embodiments of the present invention, it will be understood that modification thereof may be suggested to those skilled in the art, and it is intended to cover all such modifications as fall within the scope of the appended claims.

We claim:

1. In a method for controlling the operation of a well produced by the operation of a pumping unit including a sucker rod string and means for reciprocating said sucker rod string to produce fluid from a subterranean location within said well, the steps comprising:
    (a) driving said pumping unit with a polyphase electric motor energized by a polyphase AC electric power supply to said motor under conditions in which the speed of said motor normally varies between maximum and minimum values during strokes of said rod string;
    (b) generating a plurality of signals representative respectively of a plurality of sensed parameters for said motor, said parameters including at lease one winding temperature of said motor and the voltage for each of the phases of said power supply;
    (c) determining an overtemperature fault condition comparing said motor winding temperature signal with an overtemperature set point and generating a motor control function to shutdown said motor when said signal exceeds said set point;
    (d) determining an undervoltage fault condition comparing a function representative said phase voltage signals with an undervoltage set point and generating a control function to shutdown said motor in response to said phase voltage signal function falling below said undervoltage set point;
    (e) determining a phase imbalance fault condition be determining a deviation between said phase voltage signals, comparing said deviation with a set point indicative of phase imbalance, and in response to said deviation exceeding said set point, generating a control function to shutdown said motor; and
    (f) subsequent to shutdown of said motor, scanning said phase voltage signals and in response to said phase voltage signals exceeding said under voltage set point and the deviation between said phase voltage signals being less than said phase imbalance set point, restarting said motor.

2. The method of claim 1 wherein in response to said motor winding temperature signal exceeding said overtemperature set point and shutting down said motor, maintaining said motor in a latched-off shutdown condition.

3. The method of claim 2 further comprising the step of generating a motor speed signal representative of the speed of said motor, comparing said motor speed signal with a high speed set point representative of an approaching pump-off condition and shutting down said motor when said motor speed signal exceeds said high speed set point.

4. The method of claim 3 further comprising the step of comparing said motor speed signal with a low speed set point representative of an approaching stall condition and in response to said motor speed signal falling below said stall speed set point, generating a control function to shutdown said motor.

5. The method of claim 4 further comprising in response to said motor being shutdown in response to said motor speed signal falling below said stall speeds shut point, maintaining said motor in a latched-off shutdown condition.

6. The method of claim 1 wherein the deviation between said phase voltage signals is determined by establishing for each of said phase voltage signals a function representative of a running average of said phase voltage signal over a designated time interval, determining the imbalance between the highest and lowest of said running average functions and comparing said imbalance with the set point indicative of phase imbalance to generate said phase imbalance control function.

7. The method of claim 6 wherein said undervoltage fault condition is determined by establishing for each of said phase voltage signals, a function representative of a running average of said phase voltage signal over a designated time interval and generating said undervoltage control function in response to the lowest of said running averages falling below said undervoltage set point.

8. The method of claim 7 wherein said second recited time interval used in determining said undervoltage fault condition is greater than first recited time interval used in determining said phase imbalance fault condition.

9. The method of claim 1 further comprising steps of generating an accounting signal for each occurrence of a fault condition and applying said accounting signal to an accessible accounting memory having separate registers respectively for said overtemperature, undervoltage and phase imbalance fault conditions.

10. In a control system for a polyphase AC motor adapted for use as the prime mover of a sucker rod pumping unit and having a polyphase power supply circuit, the combination comprising:
  (a) voltage transducer means for each phase of said power supply circuit for generating a signal representative of the voltage appearing across each of said phases;
  (b) means for generating a temperature signal for at least one winding of said motor;
  (c) overtemperature fault means for comparing said motor winding temperature signal with an overtemperature set point and generating a motor control function to shutdown said motor when said temperature exceeds said overtemperature set point;
  (d) undervoltage fault means for comparing each of said phase voltage signals with an undervoltage set point and generating a control function to shutdown said motor when one of said voltage signals falls below said undervoltage set point;
  (e) phase imbalance fault determining means comprising means for sensing a deviation between said phase voltage signals and producing a signal representative of said deviation and means for comparing said deviation signal with a phase imbalance set point and in response to said deviation signal exceeding said phase imbalance set point, generating a control function to shutdown said motor,
  (f) means responsive to said overtemperature, undervoltage or phase imbalance control functions to open a contacter in said motor supply leads to shutdown said motor; and
  (g) means operative after the shutdown of said motor by said undervoltage or phase imbalance control functions for enabling the continued operation of said undervoltage and phase imbalance comparing means to restart the motor when said phase imbalance and undervoltage set points are not exceeded.

11. The system of claim 10 further comprising an accessible accounting memory unit having separate registers respectively for said overtemperature, undervoltage and phase imbalance fault conditions and means for generating an accounting signal for each occurrence of a fault condition and applying said accounting signals to said memory unit.

12. The system of claim 10 wherein said phase imbalance fault means comprises averaging means for establishing for each of said phase voltage signals a function representative of a running average of said phase voltage signal over a designated time interval, means for determining the imbalance between the highest and lowest of said running average functions and means for comparing said imbalance with the set point indicative of phase imbalance to generate said phase imbalance control function.

13. The system of claim 12 wherein said undervoltage fault means comprises second average means for establishing for each of said phase voltage signals a function representative of a running average of said phase voltage signal over a second designated time interval and means generating said undervoltage control function in response to the lowest of said running averages falling below said undervoltage set point.

14. The system of claim 13 wherein said second averaging means has a time interval for averaging which is greater than the averaging time interval of said first averaging means.

* * * * *